(12) United States Patent
Fujiwara

(10) Patent No.: US 6,757,234 B2
(45) Date of Patent: Jun. 29, 2004

(54) DISK DEVICE

(75) Inventor: Tatsunori Fujiwara, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) bydays.days.

(21) Appl. No.: 09/750,698

(22) Filed: Jan. 2, 2001

(65) Prior Publication Data

US 2001/0001267 A1 May 17, 2001

Related U.S. Application Data

(63) Continuation of application No. PCT/JP99/02528, filed on May 14, 1999.

(51) Int. Cl.[7] .............................................. G11B 33/02
(52) U.S. Cl. ..................................................... 369/77.1
(58) Field of Search .............................. 369/77.1, 77.2, 369/75.1

(56) References Cited

FOREIGN PATENT DOCUMENTS

| JP | 4-263160 | 9/1992 |
|----|----------|--------|
| JP | 8-7531 | 1/1996 |
| JP | 11-66679 | 3/1999 |

Primary Examiner—George J. Letscher
(74) Attorney, Agent, or Firm—Birch, Stewart, Kolasch & Birch, LLP

(57) ABSTRACT

A disk device includes a lock mechanism for displacing the entirety of a playing section supported through a shock-absorbing member on an outer chassis towards a disk insertion mouth by the movement of a cam flap 112 which performs loading and ejection operations and which forms a section of the playing section. The lock mechanism fixes and locks the playing section by pressing a portion of the playing section against a wall component of the outer chassis situated on a side of the disk insertion mouth.

2 Claims, 12 Drawing Sheets

US 6,757,234 B2

DISK DEVICE

CROSS-REFERENCE TO THE RELATED APPLICATION

This Application is a continuation of International Application No. PCT/JP99/02528, whose International filing date is May 14, 1999, the disclosures of which Application are incorporated by reference herein.

BACKGROUND OF THE INVENTION

1. Field of the Invention

The present invention relates to a disk device which can load different type of information recording media, such as a CD (compact disk) used as a single disk and an MD (minidisks) used in cartridge stored form, at different times on a turntable and thereafter eject such media from the turntable.

2. Description of the Related Art

FIG. 1 is a schematic view of a conventional disk device. In the figure, reference numeral 1 denotes a disk, 2 is a chassis, 3 is a drive unit, 3a is a first engaging pin, 3b is a second engaging pin, 3c is a third engaging pin, 4 is a turntable, 5 is a clamp, 6 is a damp link, 15 is a first locking plate, 15A and 16f are tapered portions, 15B is a locking portion, 16 is a second locking plate.

This disk device is characterized in that the drive unit 3 is locked in an inclined position. Furthermore, the playing section is locked by the first locking plate 15 and the second locking plate 16 in a center portion of the chassis 2. The drive unit 3 is locked at both the front and rear ends so as to be extended on both sides.

Since the conventional disk device is constructed as above, locking members for locking the playing section such as a first lock plate 15 and a second lock plate 16 are required, thereby increasing the number of components.

Furthermore, since the playing section is locked at the center of the chassis 2, the problem that the section of the disk projecting from the device during ejection is reduced has arisen.

SUMMARY OF THE INVENTION

The present invention is proposed to solve the above problems and has the object of providing a disk device which can reduce the number of components necessary for locking the playing section such as a drive unit within the chassis during the loading and ejection operations of the disk, realize a compact and simplified structure with an improved reliability and increase the degree to which the disk projects from the device during ejection.

The disk device of the present invention is provided with a lock mechanism for displacing a playing section supported through a shock-absorbing member on an outer chassis towards a disk insertion mouth by the movement of a movable member for performing loading and ejecting operations, said movable member forming a section of the playing section, said lock mechanism fixing and locking the playing section by pressing a portion of the playing section against a wall component of the outer chassis situated on a side of said disk insertion mouth.

By such an arrangement, increase in the number of components can be avoided, since the fixation of the playing section in the outer chassis during loading and ejecting operations of the disk is realized without an additional member. Thus, it is possible to provide a disk device with a compact and simplified structure as well as an improved reliability. Furthermore, it is possible to increase the degree to which the disk projects during ejection.

The disk device of the present invention may be adapted to displace the playing section towards the disk insertion mouth by abutment of the locking projection with a wall component of the outer chassis situated on the back side of the device, which is caused by displacement of the cam flap towards the back side of the device, thereby to fix and lock the playing section by pressing said portion of the playing section against the wall component of the outer chassis situated on the side of the disk insertion mouth.

By such an arrangement, increase in the number of components can be avoided, since the fixation of the playing section in the outer chassis during the loading and ejection operation of the disk is realized by the locking projection, which protrudes together with the displacement of the cam flap towards the back side of the device, without an additional member. Thus, it is possible to provide a disk device with a compact and simplified structure and with an improved reliability. Furthermore, it is possible to increase the degree to which the disk projects during ejection.

DETAILED DESCRIPTION OF THE PREFERRED EMBODIMENTS

In order to explain the present invention in greater detail, the preferred embodiments will be outlined below with reference to the accompanying figures.

Embodiment 1

Figure 1:
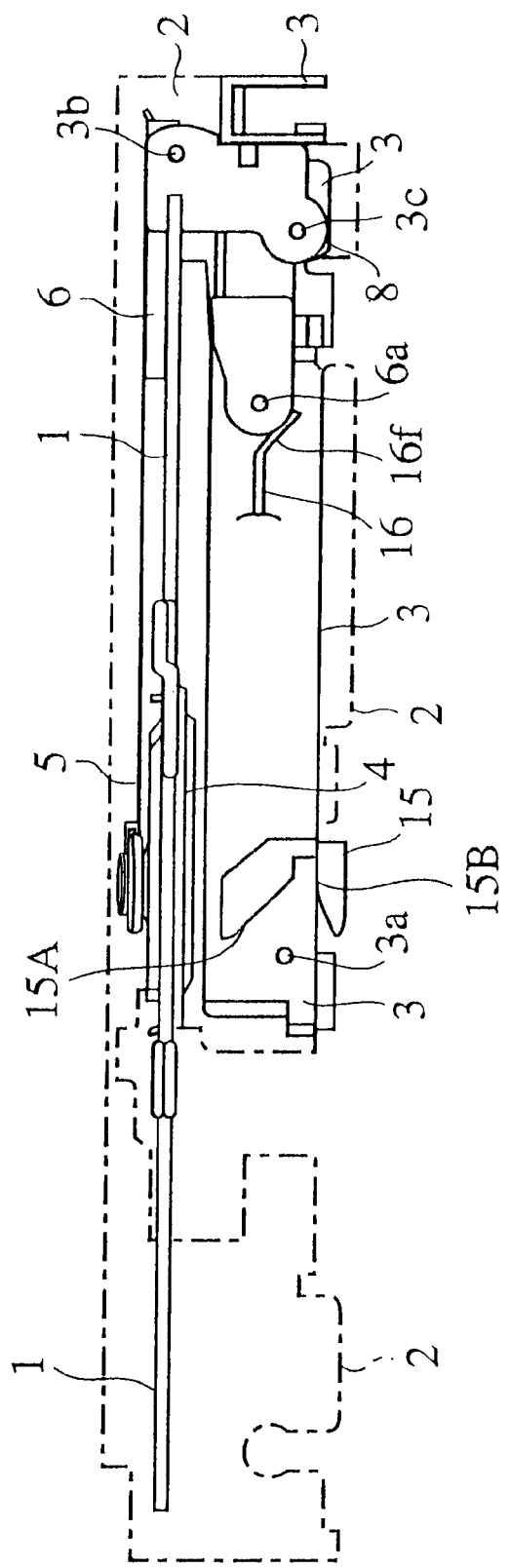
FIG. 1 is a schematic figure of a conventional disk device.
Figure 2:
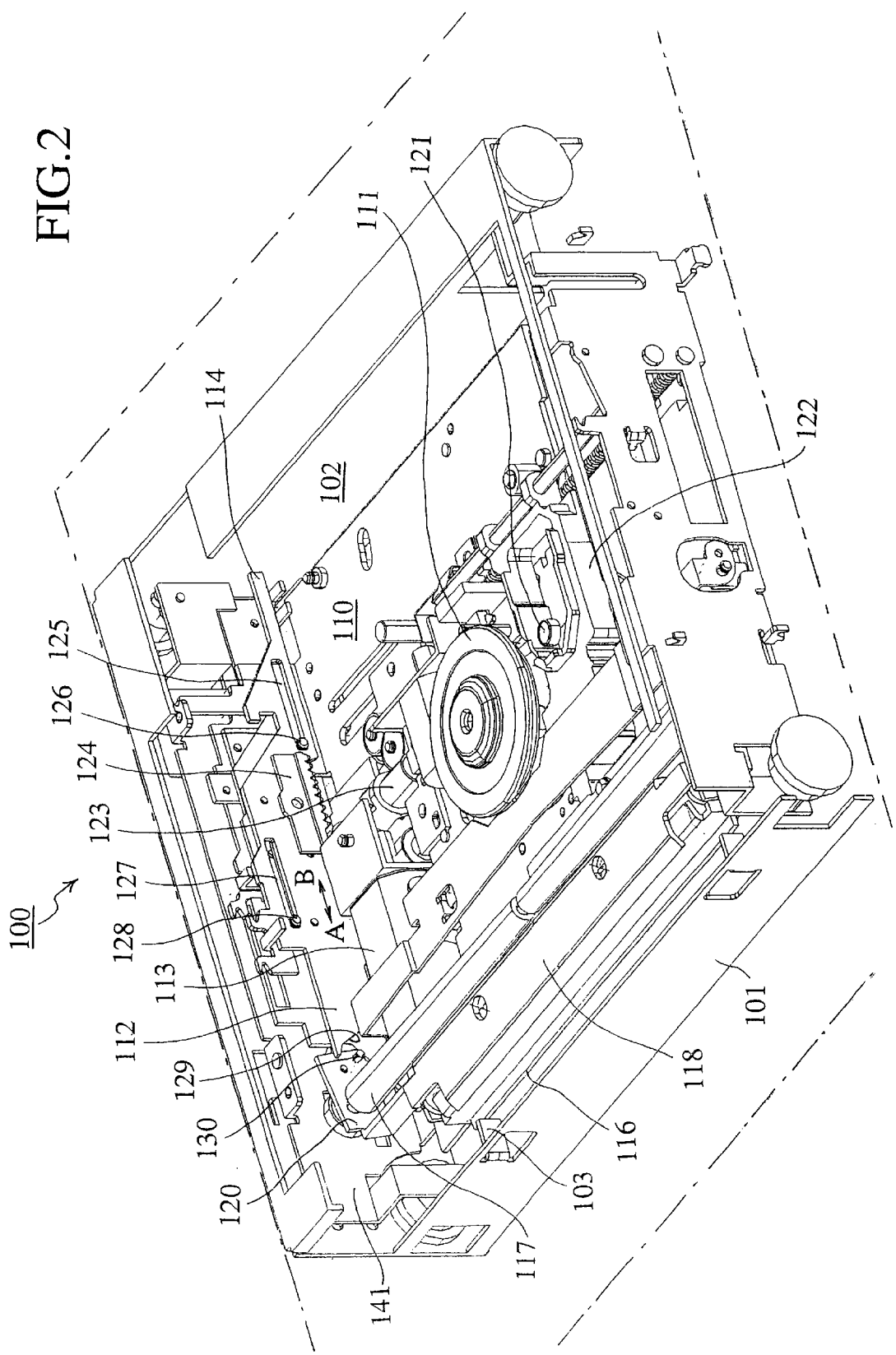
FIG. 2 shows a three dimensional representation of a disk device according to a first embodiment of the present invention.

FIG. 2 shows a three dimensional representation of a disk device according to a first embodiment of the present invention. In the figure, 100 is a main body of the disk device, 101 is a wall component (lock mechanism) of an outer chassis situated on a side of a disk insertion mouth, 102 is a wall component of the outer chassis situated on a back side of the device, 103 is a projecting piece (lock mechanism) which is formed on the wall component 101 of the outer chassis disposed towards the disk insertion mouth so as to project inwardly. The outer chassis supports the playing section, the components of which will be explained below, through a shock-absorbing member. Thus, the playing section is protected from vibration interfering with the disk playing operation.

Next, the explanation will be given of each component in the playing section.

110 is a base on which the entire playing section, the components of which will be explained below, is provided. 111 is a turntable for mounting a CD, 112 is a cam flap (movable member, lock mechanism) which is driven by a motor 113 and is displaced in direction of the arrow A or B upon loading or ejecting the disk. The cam flap 112 displaces a roller 117 upwardly or downwardly upon loading the disk into the device or ejecting the disk from the device. The cam flap 112 is disposed as a member for the mounting operation of an MD onto the turntable (not shown).

114 is a lock projection (lock mechanism) formed on one end of the cam flap 112. The tip of the lock projection 114 abuts with the wall component 102 of the outer chassis as the cam flap 112 displaces in the direction of the arrow B. As a result, the playing section provided on the base 110 is displaced in the direction of the wall component 101 of the outer chassis within the deformable range of the shock-absorbing member, a portion of the playing section is pressed against the wall component 101 of the outer chassis, and the playing section is secured and locked to the wall component 101 of the outer chassis.

116 is a link protrusion (lock mechanism) being a portion of the playing section, which abuts with the projecting piece 103. 117 is a roller which performs loading and ejection of a compact disk (hereafter CD) into and out of the device. 118 is a base flap which is disposed below the roller 117. 120 is a support section which is provided on both ends of the base flap 118 and which pivotally supports both ends of the roller 117. 121 is an optical pickup, 123 is a clutch, 124 is a rack mechanism having a rack portion, 125 is a first guide hole formed in the cam flap 112, 126 is a guide pin which engages with the first guide hole 125 and guides the cam flap 112, 127 is a second guide hole formed in the cam flap 112, 126 is a guide pin which engages with the second guide hole 127 and guides the cam flap 112. 129 is a cam face of the cam flap 112 which is formed on a side adjacent to the disk insertion mouth, 130 is a pin which engages with the cam face 129 and which is formed on the support section 120. 141 is a base sub-plate.

Figure 3:
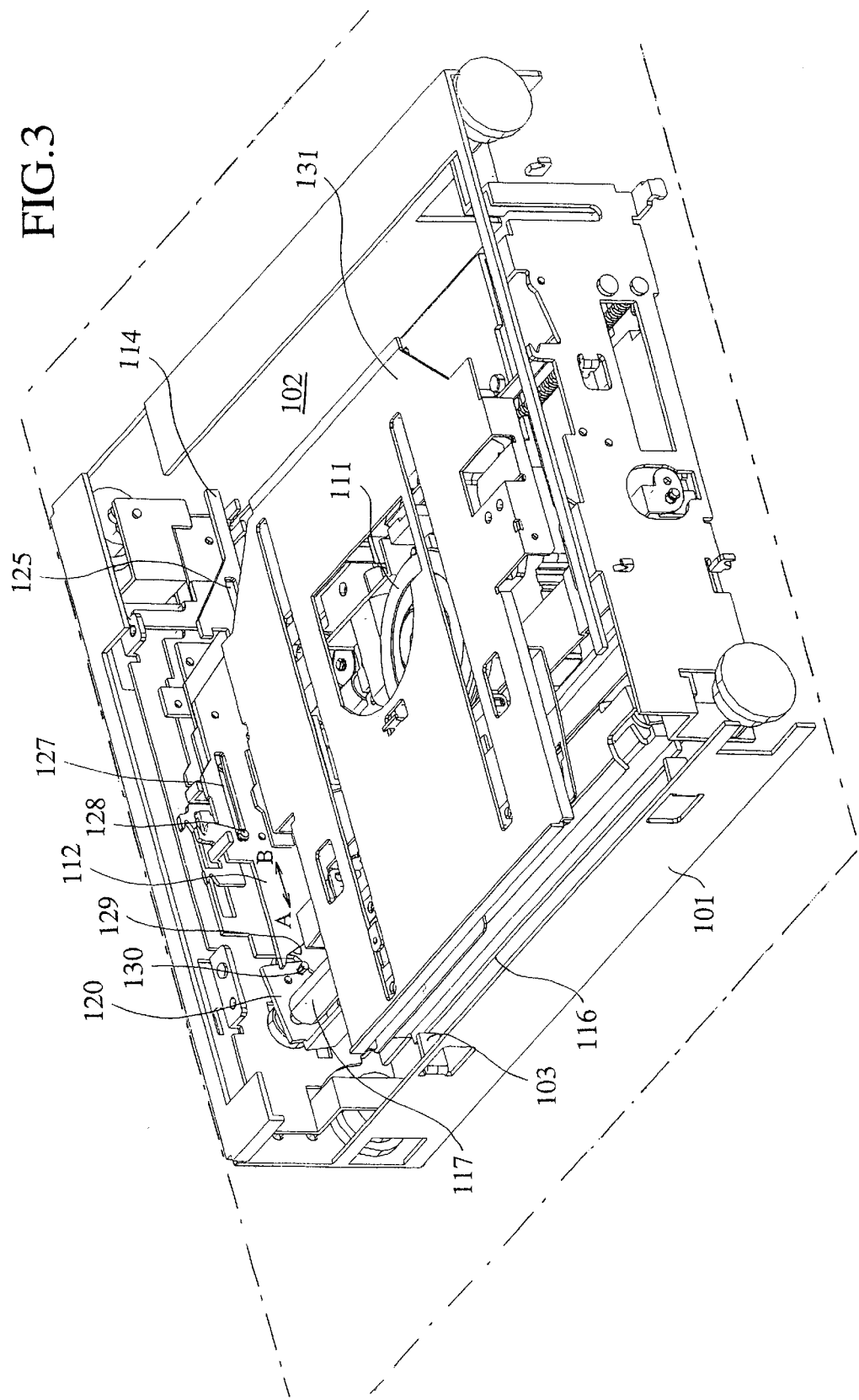
FIG. 3 shows a three dimensional representation of a disk device including an MD holder guide plate according to a first embodiment of the present invention.

FIG. 3 shows, in three dimensional form, a disk device including an MD holder guide plate 131 for guiding the MD holder (not shown), which is inserted from the disk insertion mouth, in a predetermined position into the device.

The operation of the disk device according to present invention will be discussed below.

In this disk device, the playing section is maintained in a locked state in which the playing section is pressed towards the disk insertion mouth in the outer chassis in times other than when a disk is played.

FIG. 2 and FIG. 3 show the disk device in a state of inserting the disk from the disk insertion mouth for example. The playing section is pressed and locked towards the disk insertion mouth in the outer chassis.

In this case, the cam flap 112 is in a state of being displaced in the direction of the arrow B, as a result thereof, the tip of a locking projection 114 formed on one end of the cam flap 112 abuts with the inner face of the wall component 102 of the outer chassis. Thus, the playing section is displaced towards the disk insertion mouth in the outer chassis, a section of the playing section is pressed against the wall component 101 of the outer chassis, and the playing section is fixed and locked to the wall component 101 of the outer chassis. Since the playing section is mounted in a displacable state through a shock-absorbing member such as a damper into the outer chassis, displacement of the playing section towards the disk insertion mouth is enabled due to deformation of the shock-absorbing member.

The movement of the cam flap 112 in the direction of the arrow B is realized by the rotational force of the motor 113 which rotates, through the clutch 123, the pinion meshed with a rack portion in the rack mechanism 124.

Due to the displacement of the cam flap 112 in the direction of the arrow B, the linking protrusion 116 which is disposed below the base flap 118 of the playing section abuts with the tip of the projecting piece 103 formed on the wall component 101 of the outer chassis. Thus, the playing section is fixed and locked within the outer chassis in a state that the playing section is displaced towards the disk insertion mouth.

In this locked state, since the playing section is displaced towards the disk insertion mouth within the outer chassis, the tip of the MD holder guide plate 131 is also displaced towards the disk insertion mouth to the degree that the playing section is displaced towards the disk insertion mouth, as shown in FIG. 3.

As a result, the disk insertion operation of the MD and CD from the disk insertion mouth is facilitated.

Figure 4:
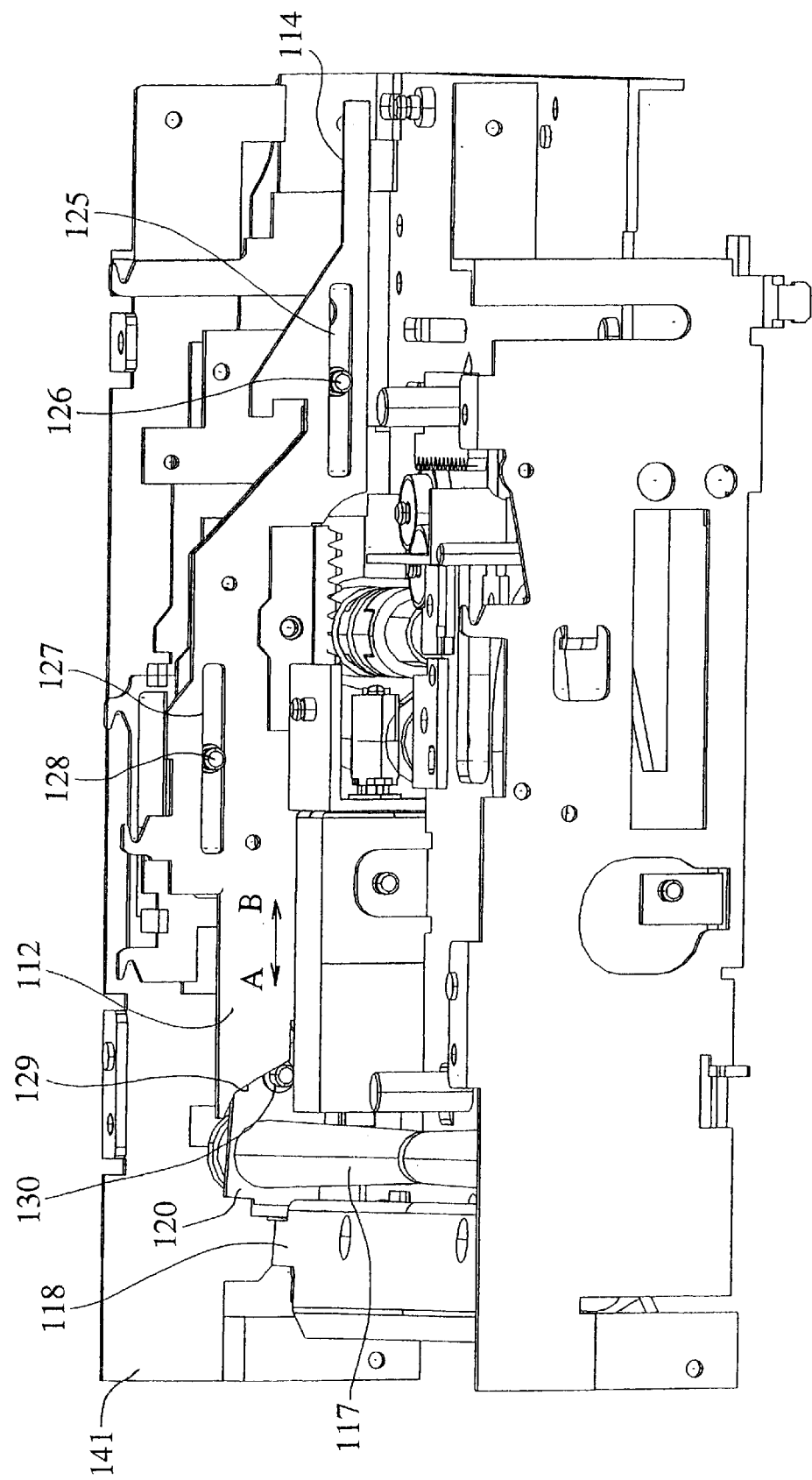
FIG. 4 is an explanatory view showing the loading operation of the disk in a disk device according to a first embodiment of the present invention.
Figure 5:
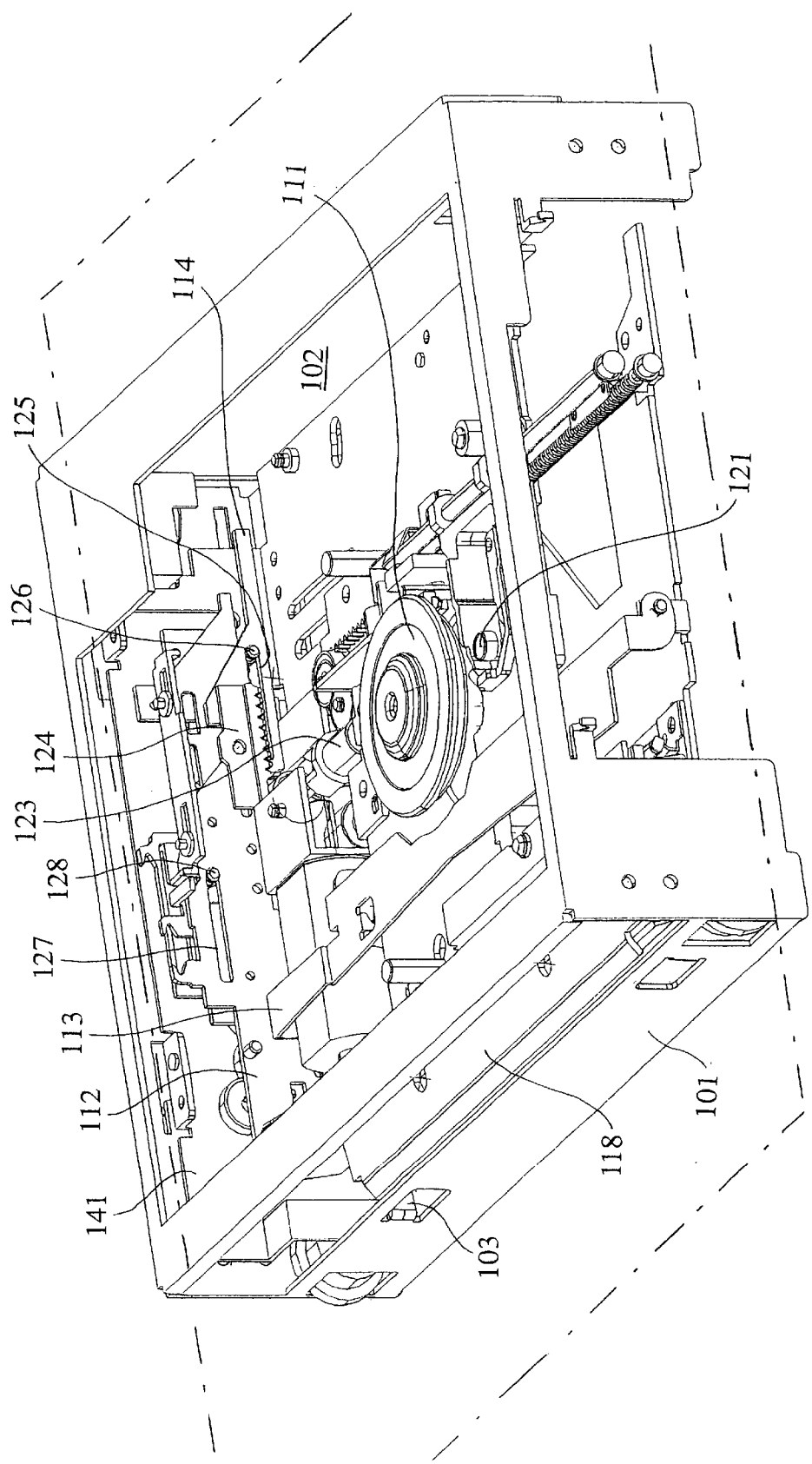
FIG. 5 is an explanatory view of the lock release operation of the playing section in a disk device according to a first embodiment of the present invention.
Figure 6:
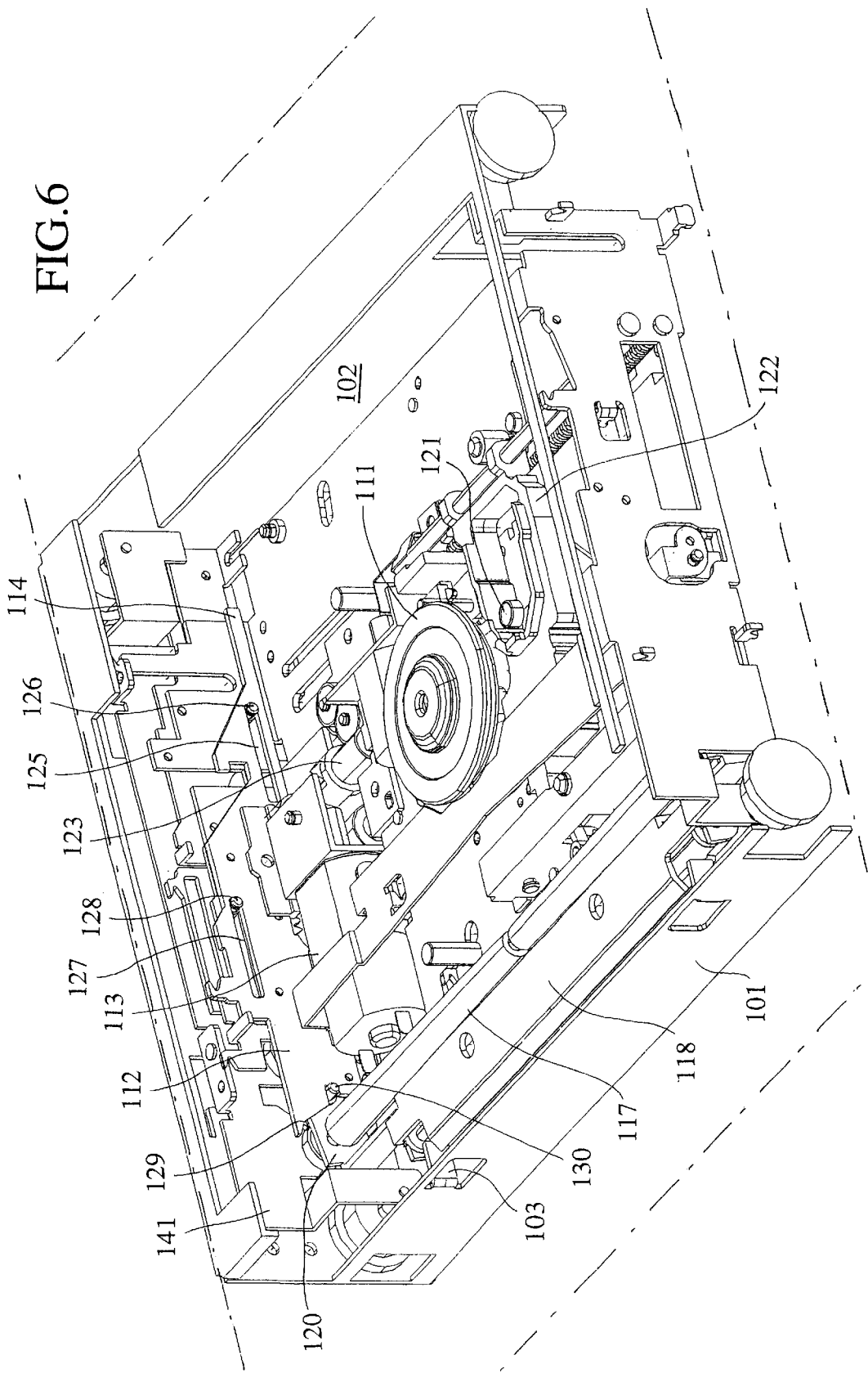
FIG. 6 is an explanatory view of the lock release operation of the playing section in a disk device according to a first embodiment of the present invention.
Figure 7:
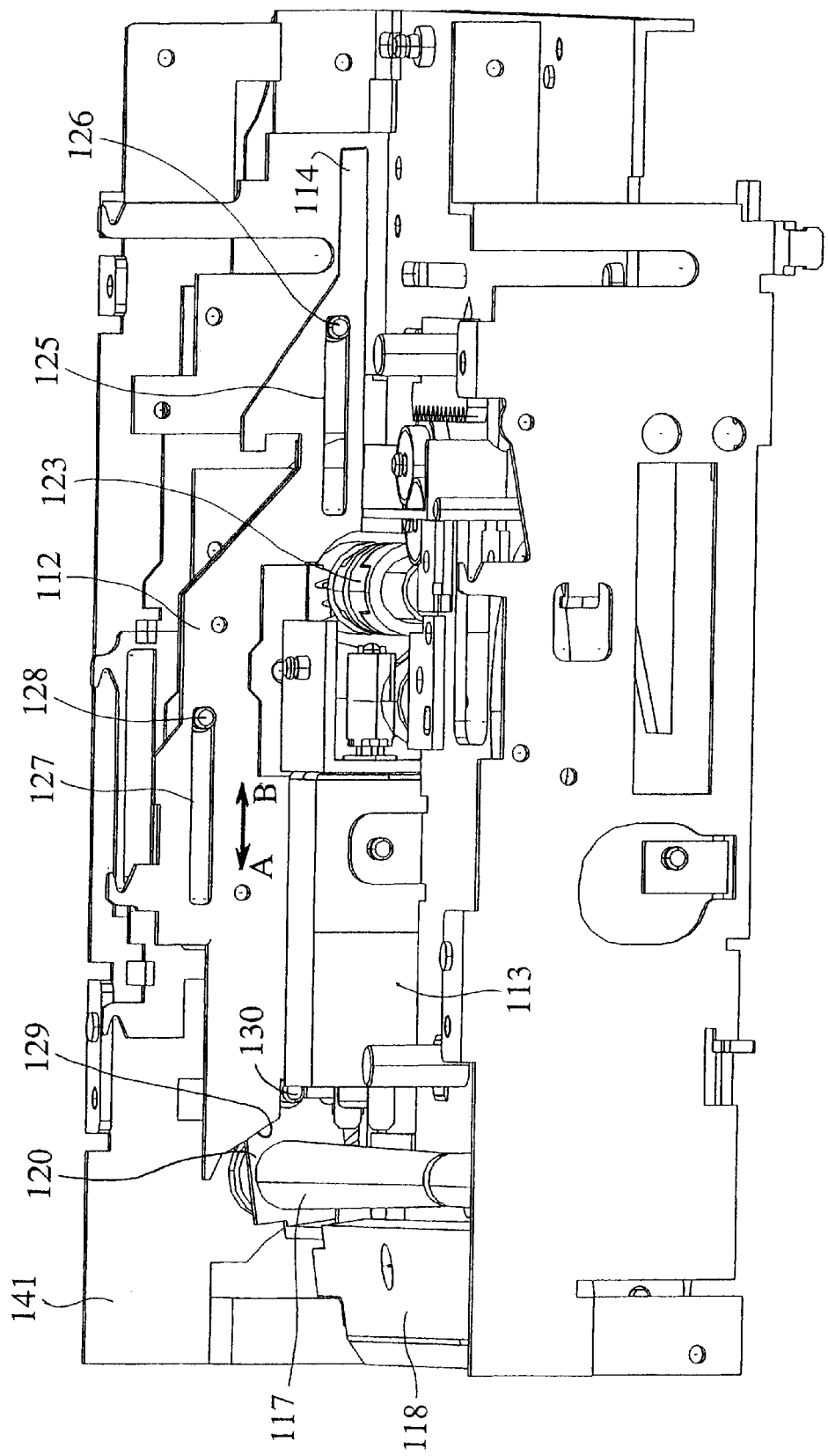
FIG. 7 is an explanatory view of the lock release operation of the playing section in a disk device according to a first embodiment of the present invention.

When inserting a disk from the disk insertion mouth, the disk is housed into the device by the rotations of the roller 117 which is caused by the insertion of the disk. When the disk is housed in a fixed position into the device, the cam flap 112 begins to displace in the direction of the arrow A due to the abutment of the peripheral edge of the disk with a fixed position (not shown) in the outer chassis. FIG. 4 shows the loading operation. When the cam flap 112 begins to displace in the direction of the arrow A, since the tip of the locking projection 114 separates from the wall component 102, the playing section is released from the locked state. Thus, the playing section returns to a predetermined position in the outer chassis due to the return force of the shock-absorbing member and is supported by the shock-absorbing member.

FIGS. 5, 6, 7, 8, and 9 show the playing section in a lock released state that the locked state is released by the displacement of the cam flap 112 in the direction of the arrow A. In this state, the playing section returns to the predetermined position in the outer chassis and is supported by the shock-absorbing member.

Figure 8:
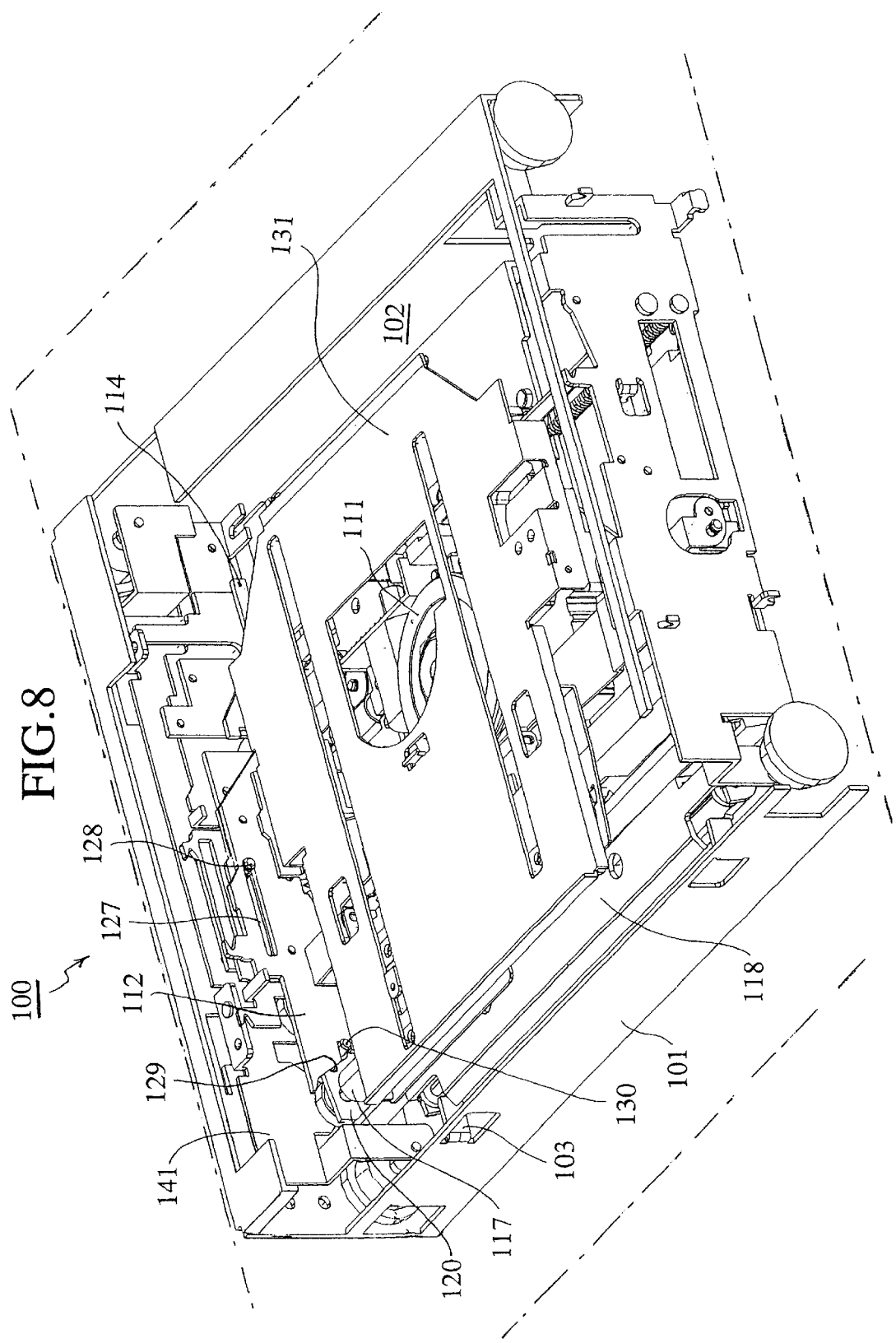
FIG. 8 is an explanatory view of the lock release operation of the playing section in a disk device according to a first embodiment of the present invention.
Figure 9:
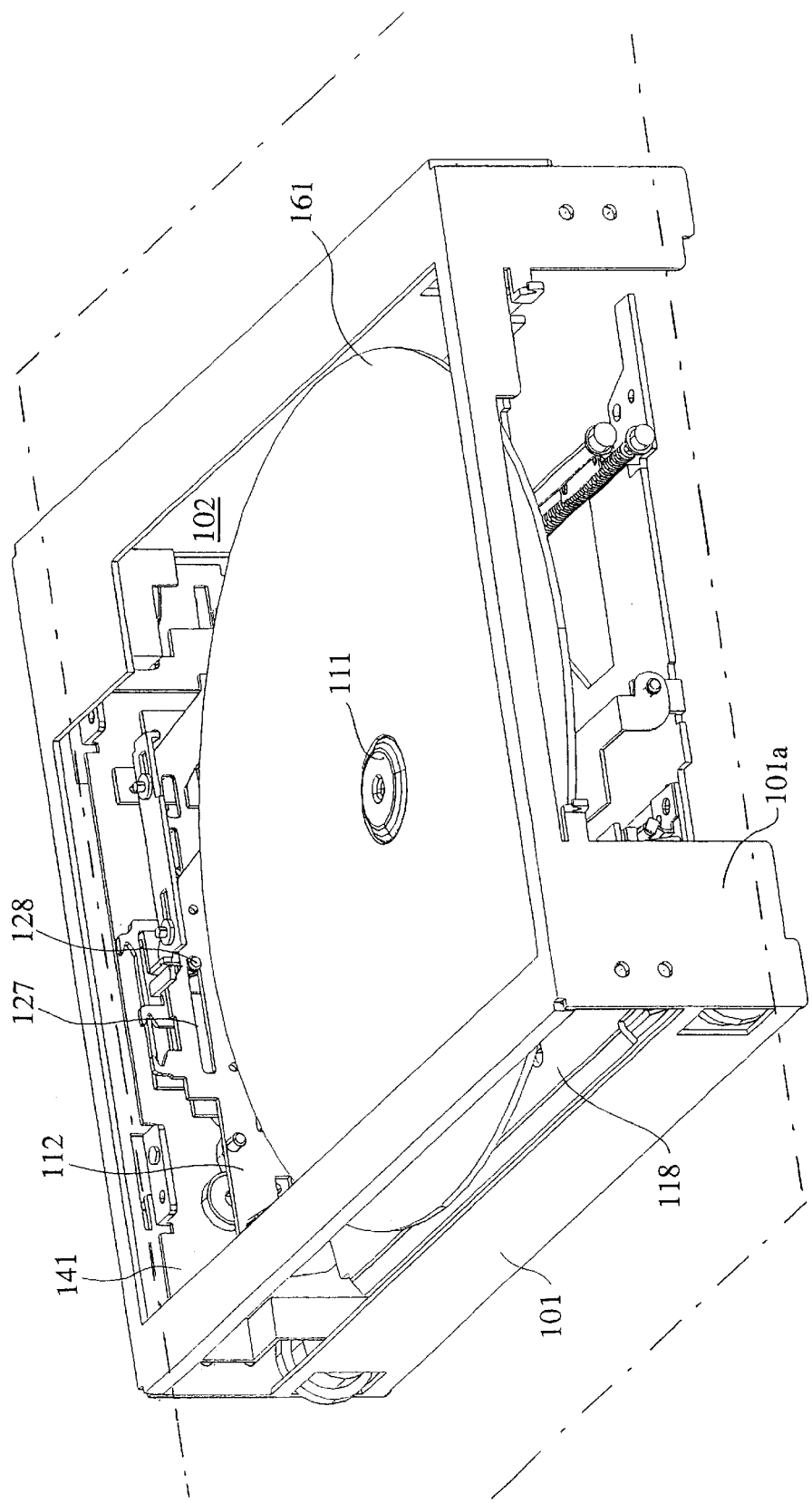
FIG. 9 is an explanatory view of the lock release operation of the playing section in a disk device according to a first embodiment of the present invention.

FIG. 8 shows the release of the locked state of the playing section when the inserted disk is an MD. FIG. 9 shows the release of the locked state of the playing section when the inserted disk is a CD.

In the state shown in FIGS. 5, 6, 7, 8, and 9, the inserted disk is set on the turntable. The cam flap 112 at this time displaces in the direction of the arrow A. Thus, a pin 130 provided on the supporting section 120 which pivotally supports an end of the roller 117 is depressed by the cam face 129, the roller 117 is displaced downwardly not to come into contact with the disk.

Figure 10:
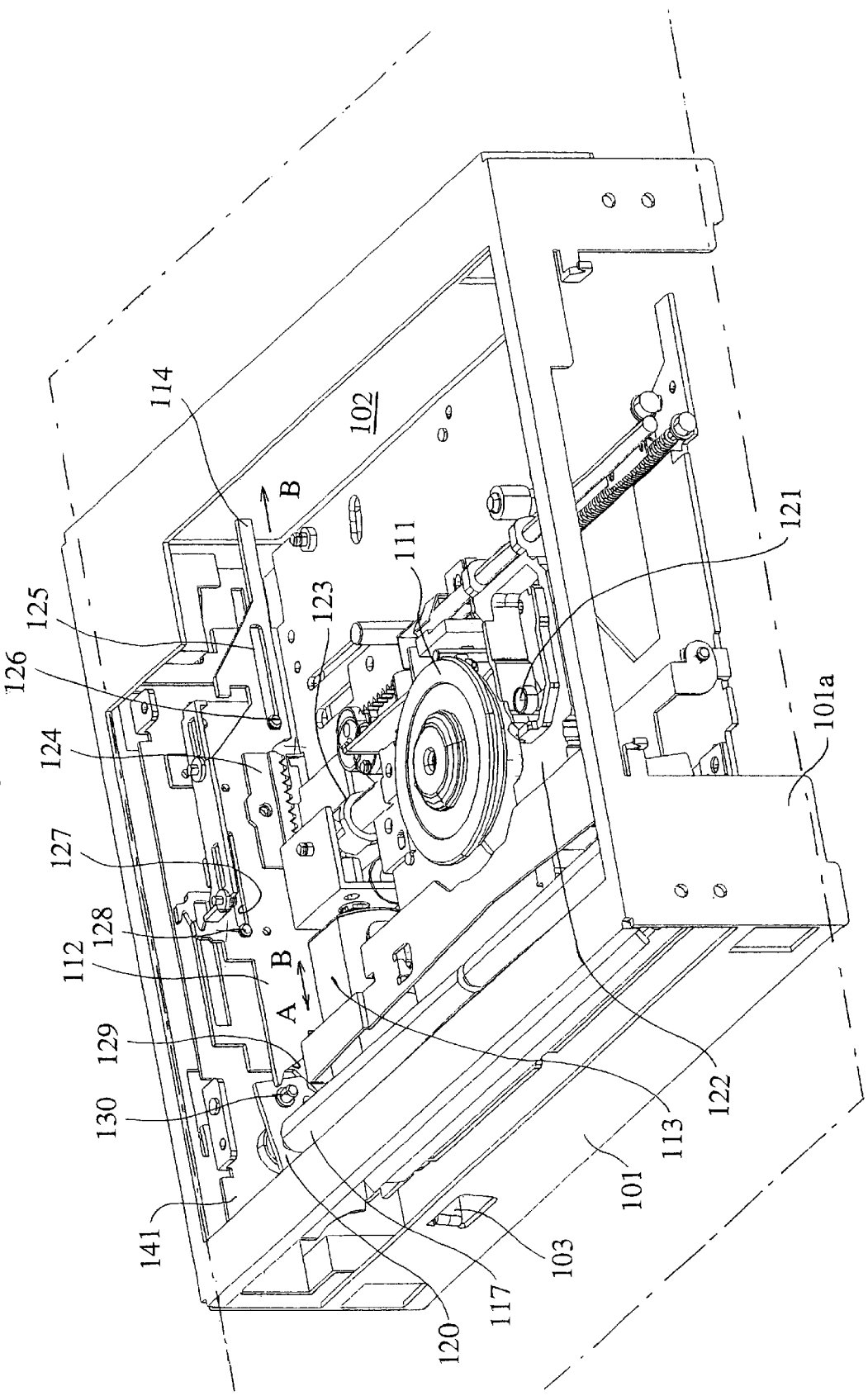
FIG. 10 explains the disk ejection operation in a disk device according to a first embodiment of the present invention.
Figure 11:
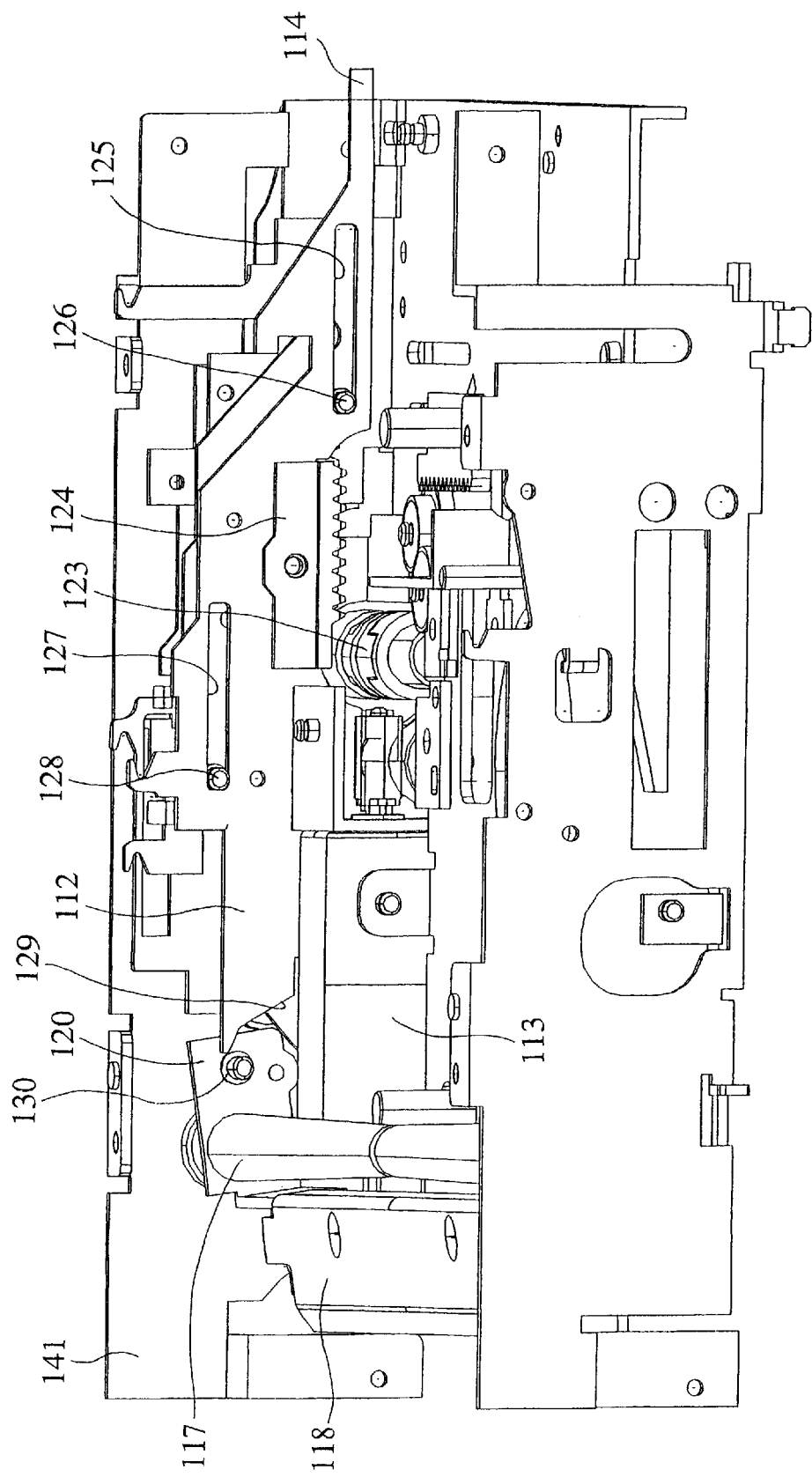
FIG. 11 explains the disk ejection operation in a disk device according to a first embodiment of the present invention.
Figure 12:
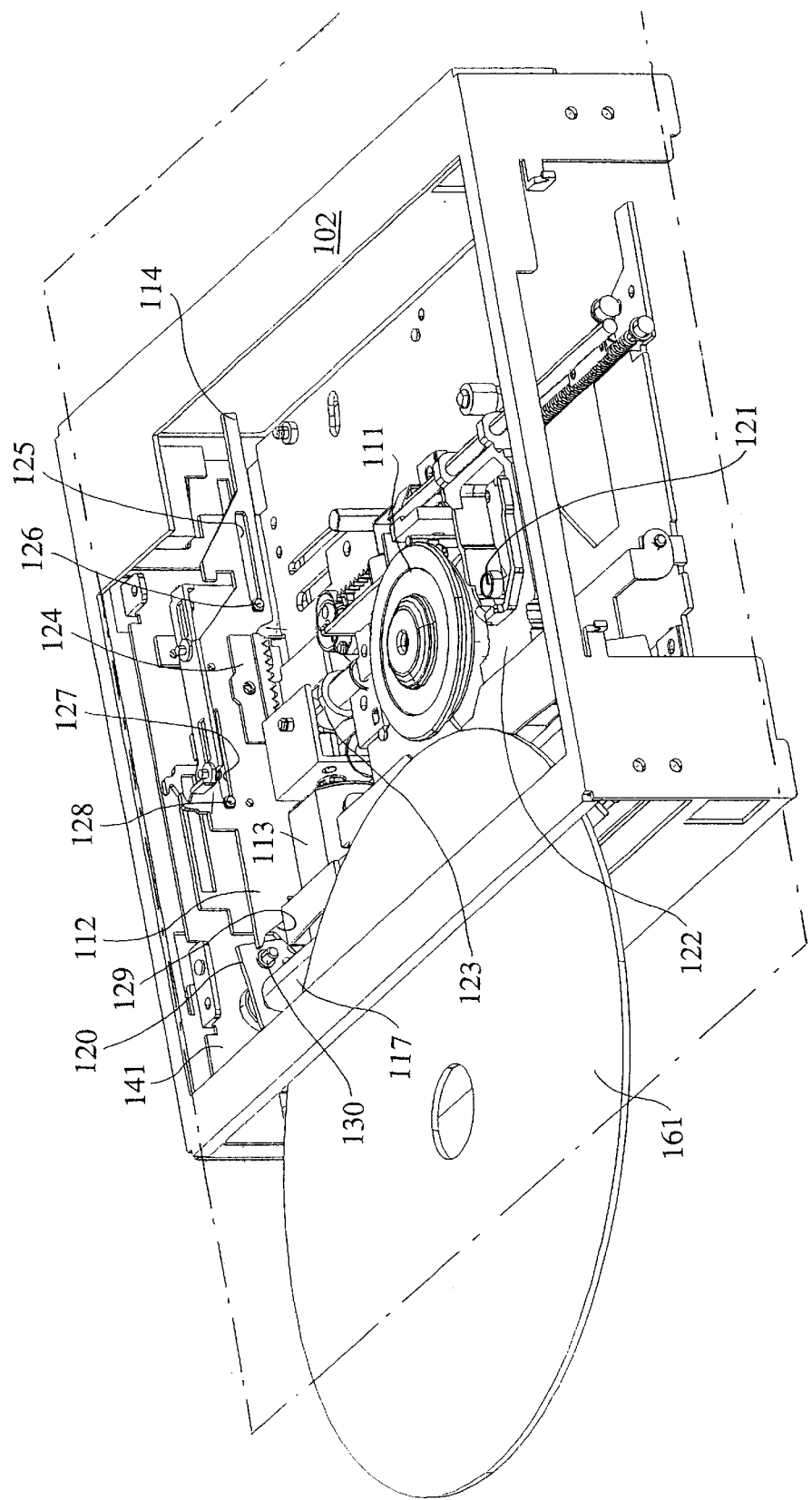
FIG. 12 explains the disk ejection operation in a disk device according to a first embodiment of the present invention.

FIGS. 10, 11 and 12 show an ejection operation of the disk. The cam flap 112 displaces in the direction of the arrow B upon ejecting the disk.

Due to the displacement of the cam flap 112 in the direction of the arrow B, the pin 130 is separated from the cam face 129 of the cam flap 112 and the roller 117 is raised upwardly. As a result, when the disk which is being played as shown in FIG. 9 is a CD 161 (a non case-stored recording medium disk), the roller 117 comes into contact with the lower face of the CD and the CD is placed in a state for ejectable from the disk insertion mouth due to the rotation of the roller 117.

Also, due to the displacement of the cam flap 112 in the direction of the arrow B, the tip of the locking projection 114 formed on an end of the cam flap 112 abuts with the inner face of the wall component 102, the linking protrusion 116 disposed below the base flap 118 of the playing section abuts with the tip of the projection piece 103 formed on the wall component 101 of the outer chassis. Thus, the playing section is fixed and locked again within the outer chassis in a state that the playing section is displaced towards the disk insertion mouth.

Furthermore, as shown in FIG. 3, the tip of the MD holder guide plate 131 is also disposed towards the disk insertion mouth to the degree that the playing section is displaced towards the disk insertion mouth. Thus, the degree of projection of the CD from the disk insertion mouth during an ejection operation of the CD is increased. The degree of projection of the MD, which is stored in the MD holder, from the disk insertion mouth during an ejection operation of the MD is also increased. As a result, the withdrawal operation of CD or MD from the disk insertion mouth is facilitated.

As shown above, according to the first embodiment of the present invention, a wall component 102 of the outer chassis is pressed by a tip of a locking projection 114 formed on a cam flap 112, the playing section is displaced towards a disk insertion mouth in the outer chassis and abuts with a projection piece 103 formed on the wall component 101 of the outer chassis which is situated on a side of the disk insertion mouth. Since the playing section is locked and fixed in a position towards the disk insertion mouth of the outer chassis, securing the playing section in the outer chassis during disk loading and ejection operation is realized with a simple structure. Furthermore, since no further components are required to secure the playing section, the number of components can be reduced. Thus, it is possible to provide a disk device with a simplified and more compact structure and with an improved reliability. In addition, operations such as disk insertion to the disk insertion mouth and disk withdrawal from the disk insertion mouth can be facilitated.

As shown above, the disk device of the present invention is adapted for use as a vehicle-mounted disk device, which can be used with both a CD used as a single disk and an MD used in cartridge stored form.

What is claimed is:

1. A disk device capable of loading and ejecting a case-stored recording medium disk housed in a disk case and a non case-stored recording medium disk not housed in a disk case and used as a single disk at different times on a turntable, said disk device being capable of playing either of said case-stored recording medium disk and said non case-stored recording medium disk, said disk device comprising:

a lock mechanism for displacing a playing section supported through a shock-absorbing member onto an outer chassis towards a disk insertion mouth by the movement of a movable member for performing loading and ejecting operations, said movable member forming a section of said playing section, said lock mechanism fixing and locking said playing section by pressing a portion of said playing section against a wall component of said outer chassis situated on a side of said disk insertion mouth.

2. A disk device according to claim 1, wherein said movable member comprises a cam flap having a locking projection on an end situated on a back side of the device, said cam flap being displaceable linearly in a feeding direction of the disk to enable feeding of the non case-stored recording medium disk and loading of the case-stored recording medium disk onto the turntable during the loading and ejecting operations, and wherein said lock mechanism displaces -said playing section towards the disk insertion mouth by abutment of said locking projection with a wall component of the outer chassis situated on the back side of the device, which is caused by displacement of said cam flap towards the back side of said device, thereby fixing and locking the playing section by pressing said portion of the playing section against the wall component of the outer chassis situated on the side of the disk insertion mouth.

* * * * *